(12) United States Patent
Gallagher et al.

(10) Patent No.: US 8,248,952 B2
(45) Date of Patent: Aug. 21, 2012

(54) OPTIMIZATION OF NETWORK ADAPTER UTILIZATION IN ETHERCHANNEL ENVIRONMENT

(75) Inventors: James R. Gallagher, Austin, TX (US); Binh K. Hua, Austin, TX (US); Hon Lam Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 12/131,367

(22) Filed: Jun. 2, 2008

(65) Prior Publication Data

US 2008/0232349 A1 Sep. 25, 2008

Related U.S. Application Data

(63) Continuation of application No. 10/960,586, filed on Oct. 7, 2004, now Pat. No. 7,403,479.

(51) Int. Cl.
*H04J 1/16* (2006.01)
(52) U.S. Cl. ........................................ 370/238; 709/241

(58) Field of Classification Search .......... 370/228–235, 370/238, 252; 709/223, 238–241; 710/38
See application file for complete search history.

(56) References Cited

U.S. PATENT DOCUMENTS

| | | | |
|---|---|---|---|
| 6,064,654 A | 5/2000 | White-Hauser | |
| 6,091,707 A | 7/2000 | Egbert et al. | |
| 6,671,254 B1 | 12/2003 | Nakahira | |
| 7,130,824 B1* | 10/2006 | Amanat et al. | 705/37 |
| 7,372,819 B2* | 5/2008 | Martin | 370/252 |
| 2002/0181403 A1 | 12/2002 | Shiraki et al. | |
| 2003/0179707 A1* | 9/2003 | Bare | 370/235 |
| 2004/0218536 A1 | 11/2004 | Yasukawa et al. | |

* cited by examiner

*Primary Examiner* — Ricky Ngo
*Assistant Examiner* — Kan Yuen
(74) *Attorney, Agent, or Firm* — Yee & Associates, P.C.

(57) ABSTRACT

Transferring data in a data processing system network is provided. Transferring data in a data processing system network according to the invention includes determining an adapter among a plurality of adapters that has the lowest transmit latency, and assigning data to be transferred to the adapter determined to have the lowest transmit latency. The data to be transferred is then transferred by the assigned adapter.

4 Claims, 4 Drawing Sheets

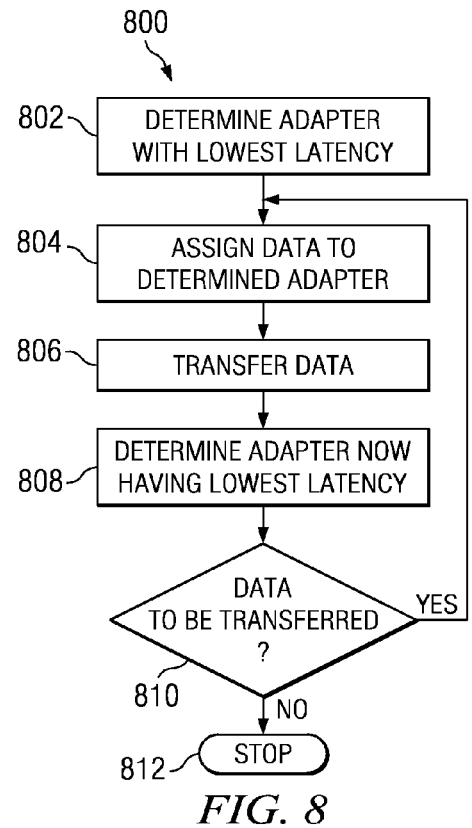
| BUS WIDTH (BIT) | BUS SPEED (MHz) | MAX BANDWIDTH (MEGABYTES/SEC) |
|---|---|---|
| 32 | 33 | 133.2 |
| 32 | 66 | 266.4 |
| 64 | 33 | 266.4 |
| 64 | 66 | 532.8 |
| 64 | 133 | 1065.6 |
| 64 | 266 | 2131.2 |
*FIG. 5*
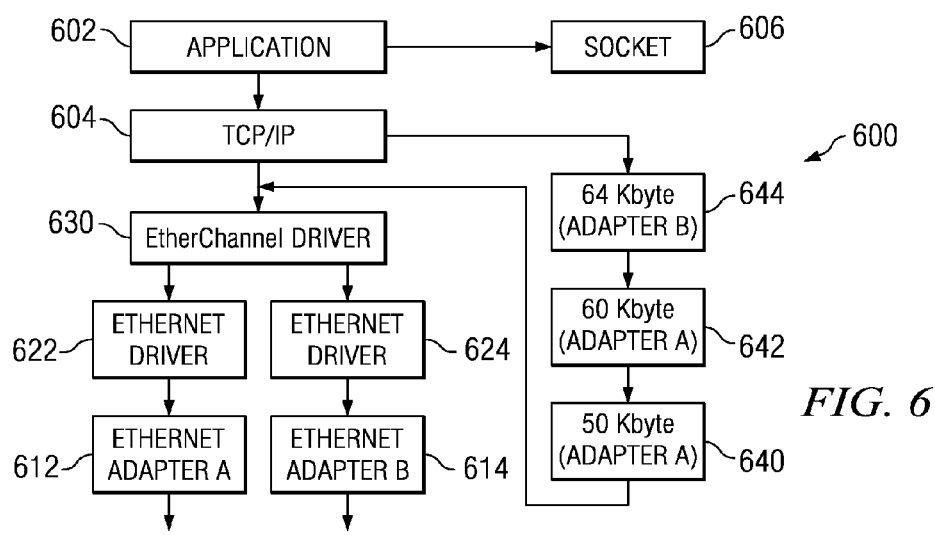

OPTIMIZATION OF NETWORK ADAPTER UTILIZATION IN ETHERCHANNEL ENVIRONMENT

This application is a continuation of application Ser. No. 10/960,586, filed Oct. 7, 2004status issued as U.S. Pat. No. 7,403,479 on Jul. 22, 2008.

BACKGROUND OF THE INVENTION

1. Technical Field

The present invention relates generally to the data processing field and, more particularly, to a method, system and computer program product for transferring data in a data processing system network.

2. Description of Related Art

Network demands in a data processing system network are increasing faster than the ability of devices in the network to handle the demands. Applications such as on-line contents, e-commerce, large databases and streaming media require more network bandwidth than conventional textual data; and the most popular 1-Gigabit Ethernet network speed adapter currently in use does not meet network bandwidth demands in some of these environments.

The EtherChannel and IEEE 802,3ad technologies have been developed to address these business needs by grouping multiple network adapters together to form a single larger pipe. FIG. 4 is a block diagram that schematically illustrates an EtherChannel interface system that is known in the art. The system is generally designated by reference number 400 and is adapted to send and receive TCP/IP protocol messages 404 to/from application 402 by opening socket 406 and reading and writing data to and from socket 406. A plurality of Ethernet adapters 412, 414, 416 and 418 are connected to transfer TCP/IP messages to and from application 402 via Ethernet drivers 422, 424, 426 and 428 and EtherChannel driver 430.

In system 400, Ethernet drivers 412-418 are grouped together to form a single larger pipe. For instance, four 1-Gigabit Ethernet adapters can be combined in a server to realize a single 4-Gigabit network interface using one IP address.

In order to balance the transmission workload among the plurality of adapters 412-418, current EtherChannel "port aggregation" software evenly allocates data packets among the adapters in a "round-robin" fashion. Although a round robin scheme performs very well in a homogeneous environment, the scheme suffers under more realistic situations. For example, low performance adapters require more time to transmit a given amount of data because of smaller bus width/speed. In addition, the throughput on the transmit side of an adapter may be affected by the workload on the receive side of the adapter.

In practice, the transmission capability of a network adapter can be affected by four factors: slot size (32 bits vs. 64 bits), slot speed (33 MHz, 66 MHz or 133 MHz), degree of I/O bus contention (how many adapters are sharing the I/O bus) and traffic rate from the network. Current EtherChannel port aggregation software employs a round-robin packet algorithm for all adapters in the same EtherChannel group. This results in undesirable transmission delay due to the latency disparities of each adapter. With a round robin scheme, accordingly, it is conceivable that adapters having a higher capability of transferring data would have to wait to receive data to be transferred while adapters having a lower capability are busy working on packets that are queued for transmission.

There is, accordingly, a need for a method, system and computer program product for transferring data in a data processing system network that utilizes network adapters to transfer data in a more efficient manner.

SUMMARY OF THE INVENTION

The present invention provides a method, system and computer program product for transferring data in a data processing system network. A method for transferring data in a data processing system network according to the invention includes determining an adapter among a plurality of adapters that has the lowest transmit latency, and assigning data to be transferred to the adapter determined to have the lowest transmit latency. The data to be transferred is then transferred by the assigned adapter. The present invention utilizes network adapters to transfer data in a more efficient manner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a table that illustrates bandwidth characteristics of a PCI bus as a function of bus width and frequency;

FIG. 6 is a block diagram that schematically illustrates an EtherChannel interface system in accordance with a preferred embodiment of the present invention;

FIG. 8 is a flowchart that illustrates a method for transferring data in a data processing system network in accordance with a preferred embodiment of the present invention.

DETAILED DESCRIPTION OF THE PREFERRED EMBODIMENT

Figure 1:
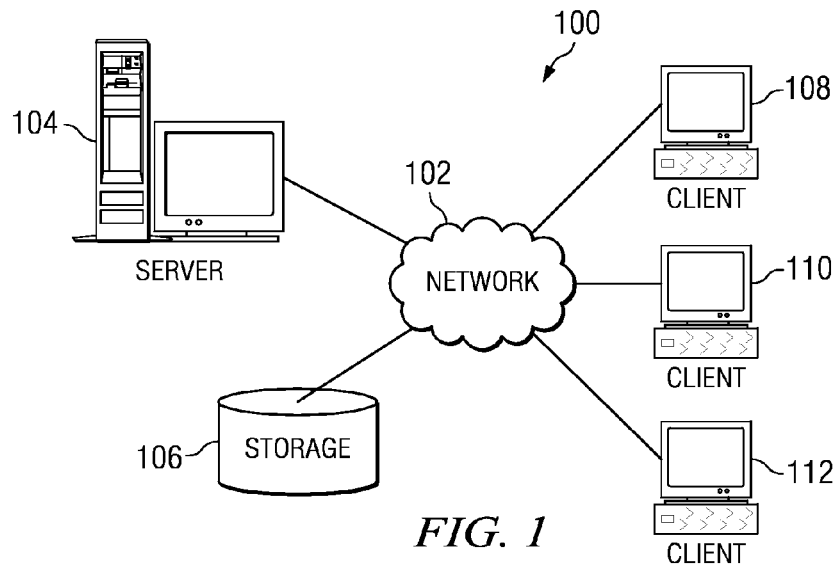
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
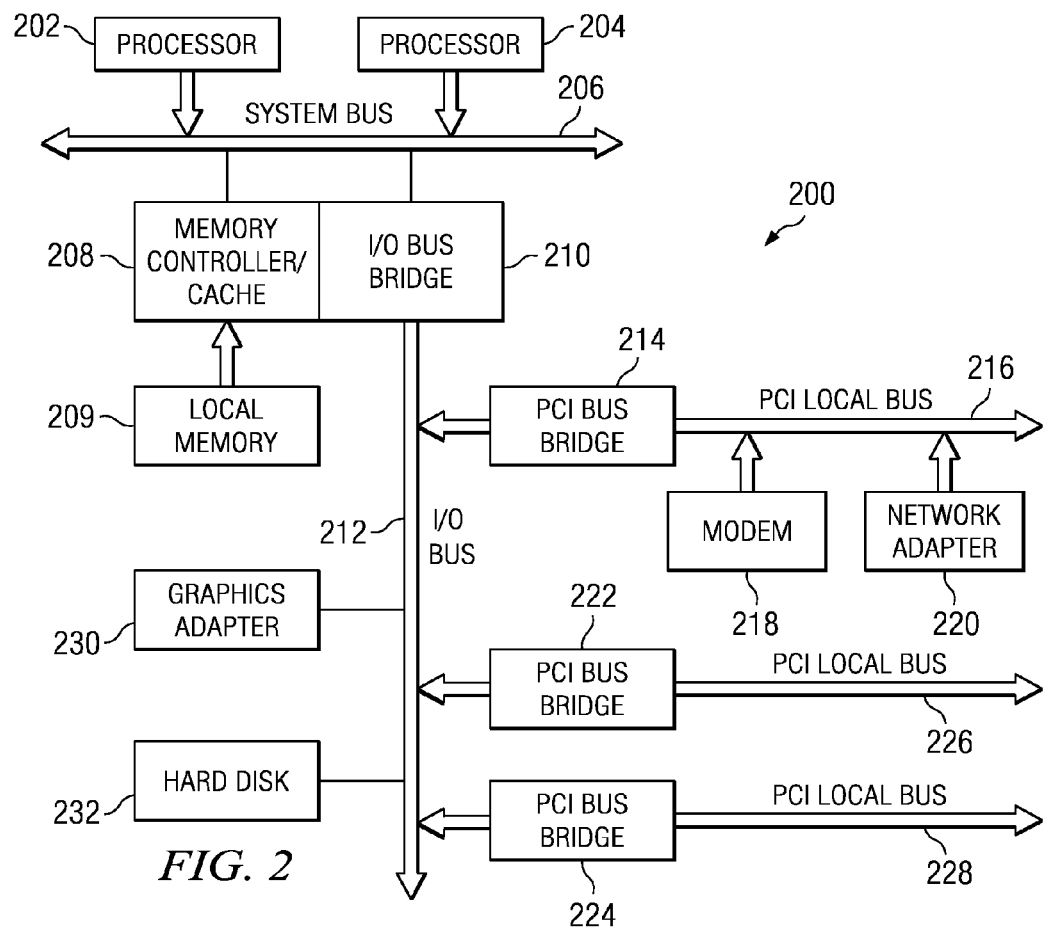
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
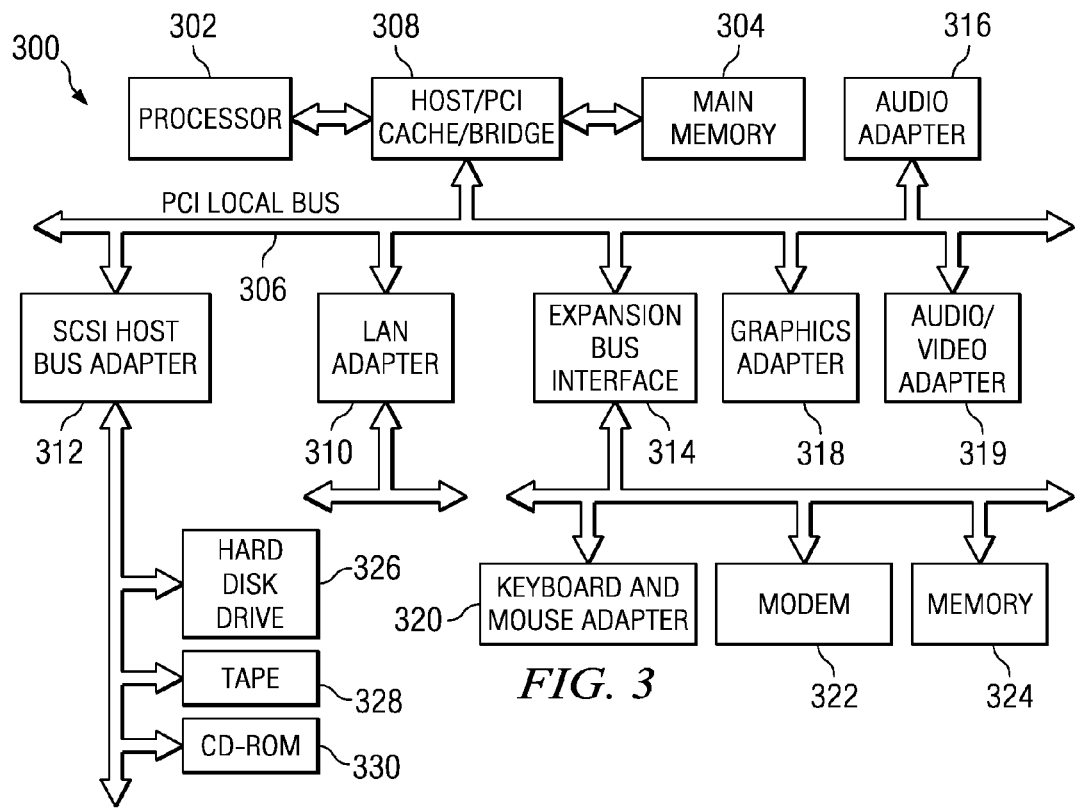
FIG. 3 is a block diagram of a data processing system that may be implemented as a client in accordance with a preferred embodiment of the present invention.
Figure 4:
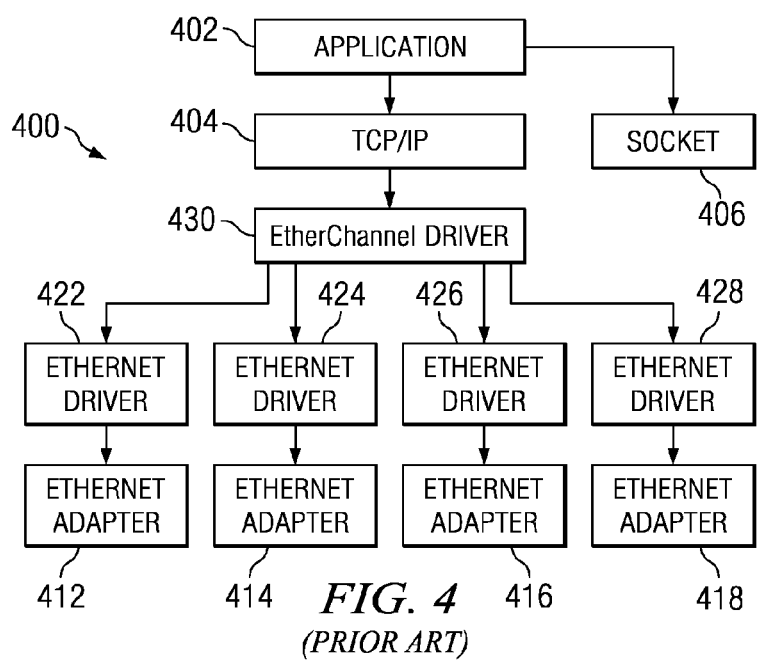
FIG. 4 is a block diagram that schematically illustrates an EtherChannel interface system that is known in the art.

With reference now to FIG. 3, a block diagram illustrating a data processing system that may be implemented as a client is depicted in accordance with a preferred embodiment of the present invention. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a mechanism for efficiently transferring data in a data processing system network. According to the present invention, logic (hardware or software) is provided in an EtherChannel interface system to determine a "current transmit latency" of each of a plurality of network adapters. EtherChannel software then uses this information to intelligently assign transmit workload to adapters that are expected to have a lower latency at the time data packets to be transferred are ready for queuing.

There are multiple ways to calculate transmit latency for identical adapters depending on how the adapters are installed in a given data processing system. For example, FIG. 5 is a table that illustrates the bandwidth characteristics of a PCI bus as a function of bus width and frequency.

The following example illustrates a transmit latency calculation method in accordance with a preferred embodiment of the present invention. In the following example, it is assumed that there are two 1 Gb adapters in an EtherChannel group. The transmit latency for each of the adapters is defined as follows:

Transmit latency=Transmit data/Bus bandwidth where "Transmit data" is the amount of data in an adapter transmit queue, and "Bus bandwidth" is the bandwidth of the adapter.

It is further assumed that the two adapters, designated herein as adapter A and adapter B, are used in the following scenarios:

Adapter A has 50 Mbytes data in an adapter transmit queue. The adapter runs at 64 bit/133 MHz. Accordingly, the transmit latency of adapter A is:

50/1065.6=46.9 msec.

Adapter B has 10 Mbytes data in an adapter transmit queue. The adapter runs at 32 bit/33 MHz. Accordingly, the transmit latency for adapter B is:

10/133.2=75 msec.

Based on the transmit latency of adapters A and B, EtherChannel software according to the present invention will queue new transmit data to adapter A because adapter A has lower latency, not with standing that it has more data to transfer.

The transmit latency values of adapters A and B, as calculated above, are dynamic and may vary at any given time depending on the amount of data in the transmit queues for adapters A and B. Therefore, in accordance with a preferred embodiment of the present invention, the following new functions are added to each adapter driver in the EtherChannel to dynamically compute the transmit latencies of the adapters.

When new data arrives from the EtherChannel to a device driver:
  The device driver re-calculates the transmit latency value of its associated adapter and updates the new value in a latency table.
  The EtherChannel software interface system finds the adapter that has the lowest transmit latency value in the latency table and updates a "current lowest latency adapter register" so that the EtherChannel software will assign the next transmit packet to the adapter having the lowest latency as directed by the register.

Each time after an adapter has transmitted data to the network:
  The device driver re-calculates the adapter "transmit latency" value and updates the new value in the latency table.
  The EtherChannel software interface system finds the adapter that has the lowest transmit latency value in the latency table and updates the "current lowest latency" adapter register so that the EtherChannel software will assign the next transmit packet to the adapter having the lowest latency as directed by the register.

In general, when new data needs to be transmitted, the EtherChannel will check the current "lowest latency" adapter register to determine which adapter has the lowest transmit latency and then send the new data to the adapter with the lowest transmit latency in order to be transmitted.

FIGS. 6 and 7A-7F illustrate an example of the operation of an algorithm to determine and assign an adapter, among a plurality of adapters, that has the lowest transmit latency in accordance with a preferred embodiment of the present invention. In particular, FIG. 6 is a block diagram that schematically illustrates an EtherChannel interface system in accordance with a preferred embodiment of the present invention, and FIGS. 7A-7F illustrate changes in a latency table and a lowest latency adapter register during a data transfer operation in accordance with a preferred embodiment of the present invention.

In FIG. 6, the EtherChannel interface system is generally designated by reference number 600 and is adapted to send and receive TCP/IP protocol messages 604 to/from application 602 by opening socket 606 and reading and writing data to and from socket 606. Ethernet adapter A 612 and Ethernet adapter B 614, are connected to transfer TCP/IP messages to and from application 602 via Ethernet device drivers 622 and 624, respectfully, and EtherChannel driver 630.

Figure 7A:
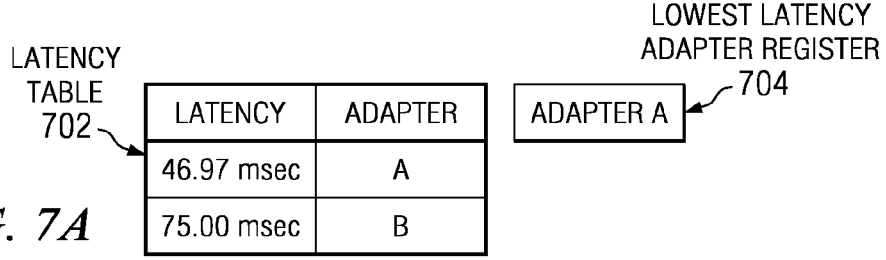
FIGS. 7A-7F illustrate changes in a latency table and a lowest latency adapter register during a data transfer operation in accordance with a preferred embodiment of the present invention.
Figure 7B:
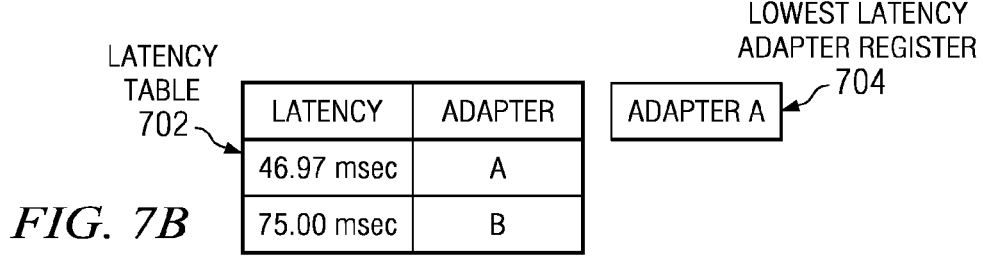

As shown in FIG. 7A, a latency table 702 initially has the values for adapter A and adapter B calculated as described in the example given above. A lowest latency adapter table 704 identifies adapter A as being the adapter having the lowest transmit latency, as was also indicated in the above example.

It is assumed that there are three Tx packets ready for queuing into the EthercChannel from TCP/IP 604. The three packets and the order and assignment of the packets to the next available low latency adapter (as will be described hereinafter) are illustrated in FIG. 6 at 640, 642 and 644.

When new 50 Kbyte packet 640 arrives from TCP/IP 604, based on the lowest latency adapter register 704, the EtherChannel software will queue the new data to adapter A. The transmit latency values for each of the adapters are then recalculated, and latency table 702 is updated with the values shown in FIG. 7B, and lowest latency adapter register 704 identifies adapter A as having the lowest latency.

Figure 7C:
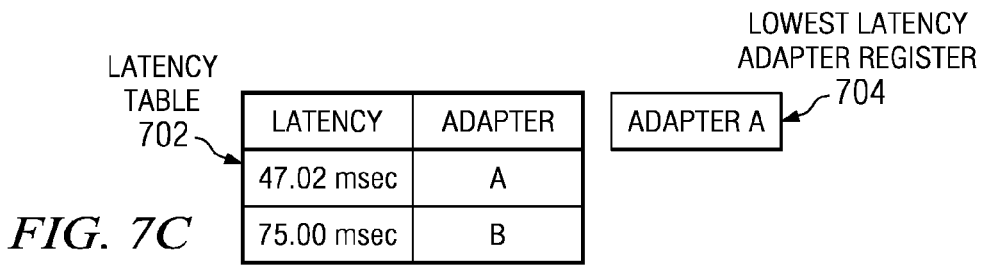

When new 60 Kbytes packet 642 arrives from TCP/IP 604, based on the lowest latency adapter register, the EtherChannel software will queue data packet to adapter A. The transmit values are again recalculated for the adapters, and latency table 702 is updated with the new values illustrated in FIG. 7C and lowest latency adapter register 704 identifies adapter A as having the lowest latency as shown in FIG. 7C.

Figure 7D:
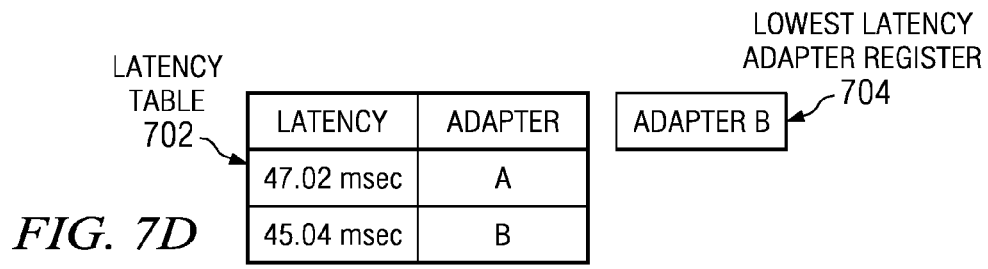

After adapter B has transferred 4 Mbytes of transmit data to the network (an arbitrary number), then the latency table values are recalculated and the adapter B has the lowest latency as illustrated in FIG. 7D.

Figure 7E:
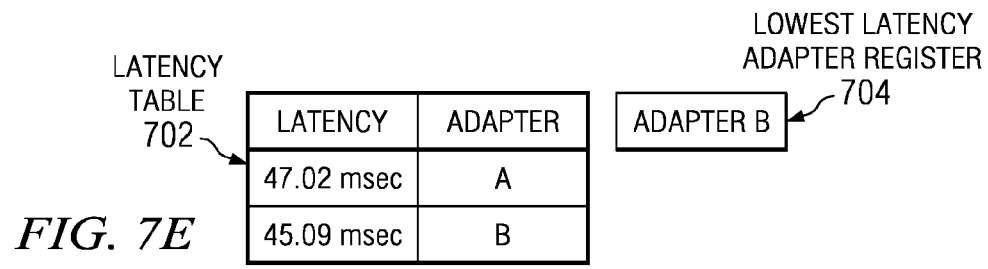

When new 64 Kbyte packet 644 arrives from TCP/IP 604, based on the lowest latency adapter register, the EtherChannel software will queue the new data to adapter B and the latency table values are re-calculated and the adapter with the lowest latency is now adapter B as shown in FIG. 7E.

Figure 7F:
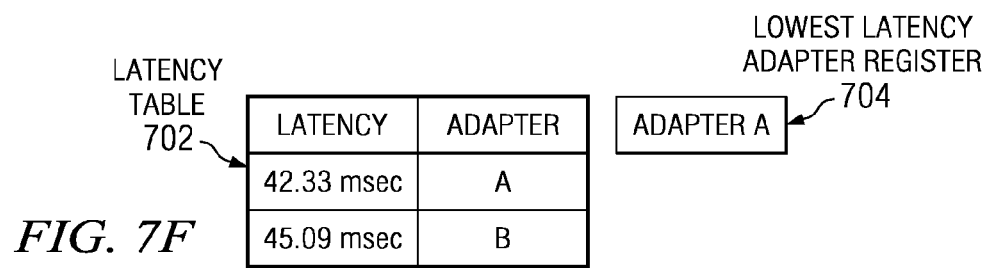

After adapter B has completed transferring 5 Mbytes of transmit data to the network (an arbitrary number), the latency table values are re-calculated and lowest latency adapter register 704 identifies register A as having the lowest latency as shown in FIG. 7F.

FIG. 8 is a flowchart that illustrates a method for transferring data in a data processing system network in accordance with a preferred embodiment of the present invention. The method is generally designated by reference number 800 and begins by determining an adapter among a plurality of adapters that has a lowest transmit latency (Step 802). Data to be transferred is then assigned to the adapter determined to have the lowest transmit latency (Step 804), and the data is then transferred by the adapter determined to have the lowest latency (Step 806). A new determination of the adapter having the lowest latency is then made (Step 808). A determination is made if further data is to be transferred (Step 810). If further data is to be transferred (Yes output of Step 810), the method returns to Step 804. If there is no further data to be transferred (No output of Step 810), the method ends (Step 812).

The present invention thus provides a method, system and computer program product for transferring data in a data processing system network. A method for transferring data in a data processing system network according to the invention includes determining an adapter among a plurality of adapters that has the lowest transmit latency, and assigning data to be transferred to the adapter determined to have the lowest transmit latency. The data to be transferred is then transferred by the assigned adapter. The present invention utilizes adapters to transfer data in a data processing system network in a more efficient manner.

Determining the transmit latency dynamically during a data transfer operation balances the adapter transmit latency by properly assigning the new transmit work load to the lowest latency adapter at the time the packet is ready for queuing to the adapter driver. The method keeps all adapters busy transferring data and thereby increases the overall throughput of the data processing system network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for transferring data in a data processing system network, comprising:
   a determining mechanism for determining an adapter among a plurality of adapters that has a lowest transmit latency, wherein each one of the plurality of adapters is associated with a different one of a plurality of device drivers, and wherein each one of the plurality of adapters transmits data using a channel driver and an associated one of the plurality of device drivers;
   wherein for each one of the plurality of adapters:
      the different one of the plurality of device drivers that is associated with the one of the plurality of adapters calculates a transmit latency for the one of the plurality of adapters each time the different one of the plurality of device drivers receives the data from a channel system, which includes the channel driver, to be transmitted by the one of the plurality of adapters, wherein the different one of the plurality of device drivers updates one of a plurality of entries in a latency table to include the calculated transmit latency;
   wherein each time one of the plurality of device drivers receives the data:
      the channel system uses the plurality of entries to identify a particular one of the plurality of adapters that has a lowest transmit latency; and
      the channel system updates a latency register to store an identification of the particular one of the plurality of adapters that has the lowest transmit latency;
   wherein the transmit latency of each of the plurality of adapters is calculated by: dividing queued data to be transmitted by the one of the plurality of adapters by a bus bandwidth of the one of the plurality of adapters; and
   an assignment mechanism for assigning new data to be transferred to the particular one of the plurality of adapters that has the lowest transmit latency.

2. The system according to claim 1, wherein the determining mechanism comprises a calculator for calculating the transmit latency of each of the plurality of adapters.

3. A computer program product in a non-transitory computer readable medium for transferring data in a data processing system network, comprising:
   a first instruction for determining an adapter among a plurality of adapters that has a lowest transmit latency, wherein each one of the plurality of adapters is associated with a different one of a plurality of device drivers, and wherein each one of the plurality of adapters transmits data using a channel driver and an associated one of the plurality of device drivers;
   wherein for each one of the plurality of adapters:
      a second instruction for calculating, by the different one of the plurality of device drivers that is associated with the one of the plurality of adapters, a transmit latency for the one of the plurality of adapters each time the different one of the plurality of device drivers receives the data from a channel system, which includes the channel driver, to be transmitted by the one of the plurality of adapters, wherein the different one of the plurality of device drivers updates one of a plurality of entries in a latency table to include the calculated transmit latency;
   wherein each time one of the plurality of device drivers receives the data:
      a third instruction for using, by the channel system, the plurality of entries to identify a particular one of the plurality of adapters that has a lowest transmit latency; and
      a fourth instruction for updating, by the channel system, a latency register to store an identification of the particular one of the plurality of adapters that has the lowest transmit latency;
   wherein the transmit latency of each of the plurality of adapters is calculated by: dividing queued data to be transmitted by the one of the plurality of adapters by a bus bandwidth of the one of the plurality of adapters;
   a fifth instruction for assigning new data to be transferred to the particular one of the plurality of adapters that has the lowest transmit latency.

4. The computer program product according to claim 3, wherein the fifth instruction comprises:
   a sixth instruction for placing the new data in a queue for the particular one of the plurality of adapters that has the lowest transmit latency.

* * * * *